Dec. 19, 1939.  C. H. AMES  2,184,109
ORCHARD HEATING APPARATUS
Filed Aug. 30, 1937  3 Sheets-Sheet 1
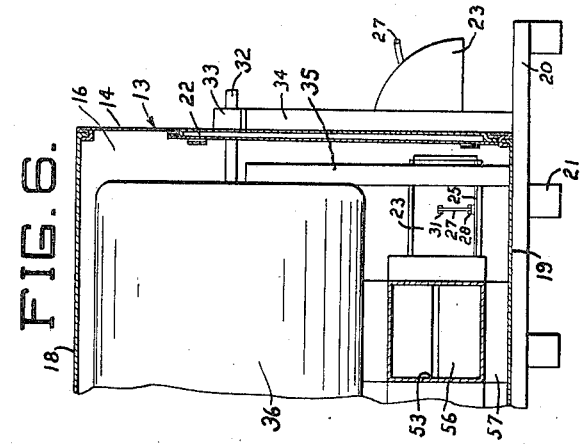
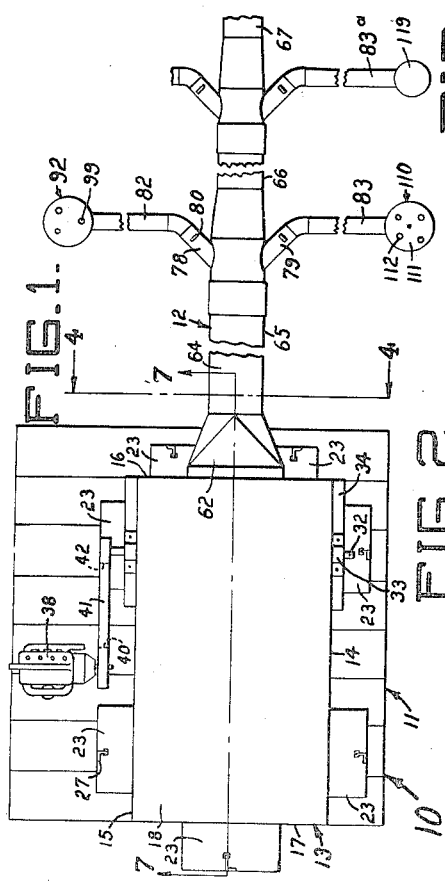
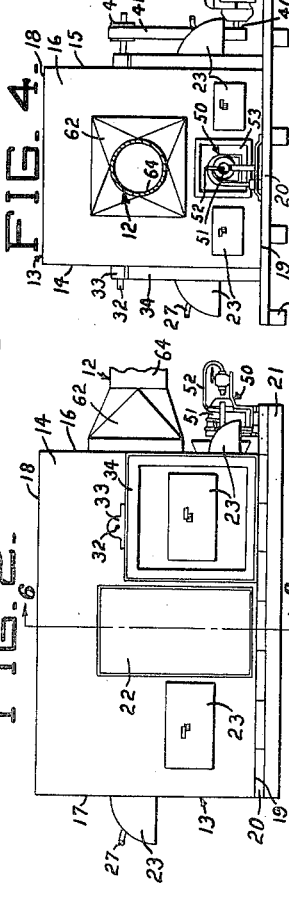
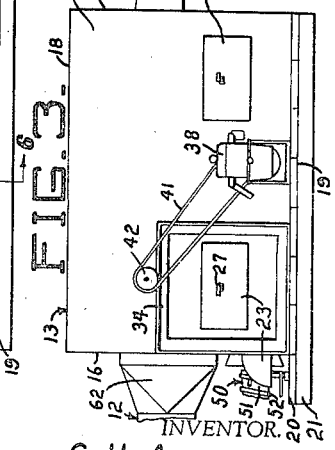
INVENTOR.
C. H. AMES
BY
ATTORNEY.

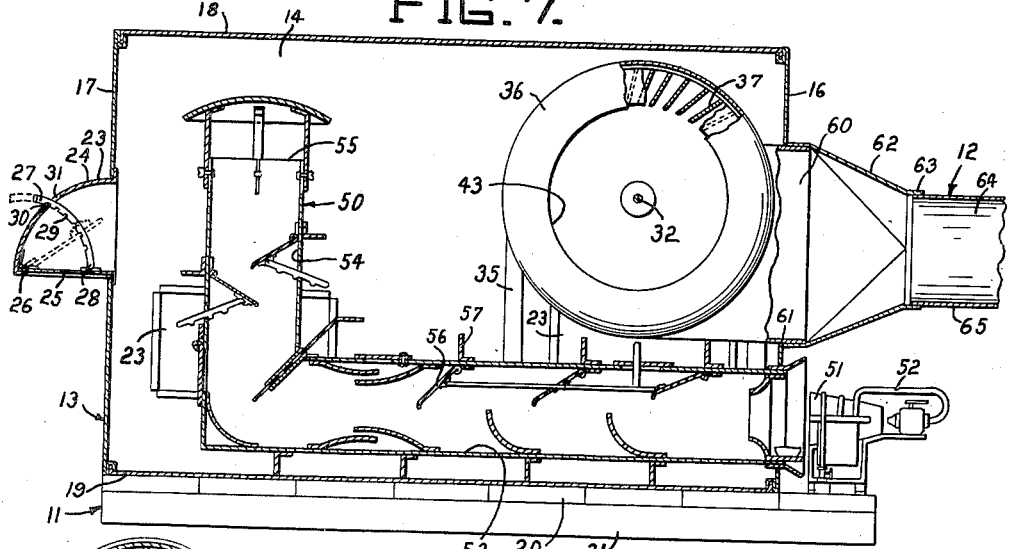

Dec. 19, 1939.　　　　C. H. AMES　　　　2,184,109
ORCHARD HEATING APPARATUS
Filed Aug. 30, 1937　　　　3 Sheets-Sheet 3
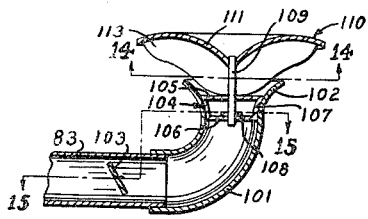
FIG.16.
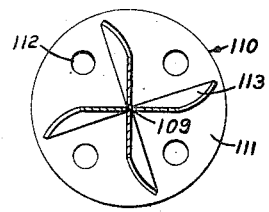
FIG.17.
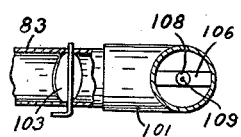
FIG.18.
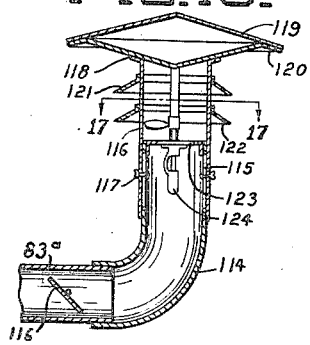
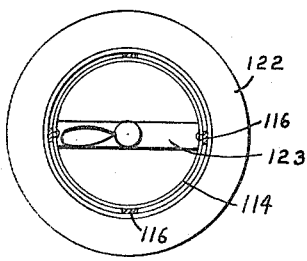
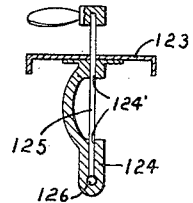
INVENTOR.
C. H. AMES
BY
ATTORNEY.

Patented Dec. 19, 1939

2,184,109

UNITED STATES PATENT OFFICE 2,184,109

ORCHARD HEATING APPARATUS

Charles H. Ames, Whittier, Calif.

Application August 30, 1937, Serial No. 161,539

4 Claims. (Cl. 47—2)

The invention relates to orchard heating apparatus.

The general object of the invention is to provide an improved heating apparatus for use in orchards whereby heated products of combustion mingled with warm air are distributed about the orchard at effective locations.

A more specific object of the invention is to provide an improved distributing system for use in orchard heating.

A further object of my invention is to provide an improved outlet control for a warm air orchard heating pipe.

Other objects and the advantages of my invention will be apparent from the following description taken in connection with the accompanying drawings, wherein:

Fig. 1 is a top plan view showing my orchard heating apparatus;

Fig. 2 is a side elevation showing one side of the heater;

Fig. 3 is a side elevation showing the other side of the heater;

Fig. 4 is a section taken on line 4—4 Fig. 1;

Fig. 5 is an end view with parts broken away and showing the heater;

Fig. 6 is an enlarged section taken on line 6—6 Fig. 2;

Fig. 7 is a section taken on line 7—7 Fig. 1;

Fig. 8 is a fragmentary, central, sectional view showing the outlet pipe;

Fig. 9 is a section taken on line 9—9 Fig. 8;

Fig. 10 is a central, sectional view showing an air outlet;

Fig. 11 is a section taken on line 11—11 Fig. 10;

Fig. 12 is a section taken on line 12—12 Fig. 10;

Fig. 13 is a section showing another outlet;

Fig. 14 is a section taken on line 14—14 Fig. 13;

Fig. 15 is a section taken on line 15—15 Fig. 13;

Fig. 16 is a section showing a further outlet;

Fig. 17 is a section taken on line 17—17 Fig. 16; and

Fig. 18 is a section of the fan mounting.

Referring to the drawings by reference characters I have shown my invention as embodied in an orchard heating apparatus which is indicated generally at 10. As shown the apparatus includes a heating unit 11 and a distributing unit 12.

The heating unit includes a housing 13 which is preferably made of metal and which includes sides 14 and 15, ends 16 and 17, a top 18 and a bottom 19. The housing is shown as mounted upon a floor 20 which is arranged upon suitable cross members 21.

The housing includes a door 22 by means of which access may be had to the interior. The housing also includes a plurality of inlets 23 which are shown as disposed one on one end and two on the other end and two on each side. Each of the inlets 23 as shown in Fig. 7 includes a quadrantal shaped cover portion 24 which provides a lower aperture which is covered by a closure member 25 hinged as at 26. An arcuate arm 27 is hinged on the upper surface of the closure as at 28 and has teeth 29 which engage the edge 30 of an aperture 31 in the cover portion 24 to hold the closure 25 in position so that the volume of air entering the housing through each inlet may be regulated.

Extending transversely through the housing 13 I show a shaft 32 which is mounted in suitable bearings 33 which are supported on a frame member 34 which is arranged on the exterior of the housing.

A frame member 35 on the interior of the housing 13 supports a cylindrical shell 36 in which a blower impeller 37 is mounted. This impeller 37 is on the shaft 32 previously mentioned and the shaft is shown as driven by means of a prime mover 38 which is shown as a gasoline engine although it will be understood that other suitable types of prime movers may be employed. The engine includes a pulley 40 which drives a belt 41 which in turn drives a pulley 42 mounted on the shaft 32 previously described and the construction is such that when the prime mover 38 is operated the impeller will be driven and will draw air from apertures 43 at each end of the shell 36. This air will be drawn through the housing inlets 23 and the amount drawn through each inlet will be controlled by means of the closures 25.

The blower also draws products of combustion from a heating member 50 which is shown as disposed in the housing 13. This heating unit 50 is substantially the same as that disclosed in my co-pending application, Serial No. 125,000, filed February 10, 1937, now Patent No. 2,097,544 granted November 2, 1937, for Radiant orchard heater and as shown includes a burner member 51 adapted to burn oil or gas supplied by a pipe 52 and to discharge the products of combustion into a horizontal portion 53 of the unit 50 whence the products of combustion pass through the portion 53 to a vertical portion 54 and from the upper end through the outlet portion 55 thereof. Suitable baffles 56 and radiation flanges 57 are employed in the unit 50 and for a further description of the heating element reference is made to the above mentioned patent.

The air blower housing 36 includes a rectangular outlet 60 which extends through an aperture 61 in the housing 13 and merges, by means of a polygonal portion 62, into a cylindrical sleeve 63 which is secured to a hollow metal conduit member 64 of the distributing unit 12 previously mentioned.

As shown the conduit 64 includes a plurality of sections designated 65, 66, and 67 which decrease in cross sectional area away from the housing. Each of these sections on the outer end as shown, for instance in Fig. 8, includes an inner portion 71 having a sleeve 72 secured thereto as by welding and the sleeve 72 receives a portion 73 which constitutes the remainder of the conduit 12. The joint between the parts 71 and 73 may be a sliding one so that the distributing unit may be disassembled and removed during the warmer periods of the year.

Each of the sections 65, 66, and 67 is provided with a plurality of plane, spaced, vanes 74, 75, 76, and 77 which are shown as arranged horizontally and vertically to maintain the direction of flow of the heated products of combustion in a straight forward direction so that the forward direction will be restored immediately in advance of the distributing outlets which I will now describe. The sections 65 to 67 are each provided with a pair of opposed distributing outlets 78 and 79 having dampers 80 therein. The outlets are shown as arranged at 45 degrees to the axis of the conduit and the outlets are disposed adjacent to the portions of reduced area and where there is a slight tendency to back pressure in the moving column so that it is assured that the heated products of combustion will pass from the conduit. The outlets 78 and 79 communicate with elbows 81 which in turn communicate with lateral conduits 82, 83, and 83a.

The conduit 82 on one side of the section 65 has an upwardly directed outlet 85 provided with a flaring upper end 86 and a damper 86', shown in Fig. 10. Adjacent the lower portion of the flaring part I provide a transversely extending supporting strip 87 which includes an upper portion 88, a lower portion 89 and side portions 89' which are suitably welded or otherwise secured in place.

The member 89 has a reinforcing member 90 and the members 88, 89, and 90 have aligned apertures which receive a rotatable shaft 91 on which an outlet member 92 is mounted. This member includes a top portion 93, a side wall 94 and a lower inner wall 95 which has its lower edge 96 spaced from the adjacent portion of the flaring part 86 to provide a passage 96'. The side 94 is provided with outlet apertures 97 and the wall 93 is provided with inwardly bent tongues 98 which provide outlet apertures 99.

The tongues 98 and apertures 99 are disposed between downwardly directed vane members 100 which are of the configuration shown in Figs. 10 and 11 and which as will be seen are inclined so that the column of air striking thereagainst will cause the member 92 to rotate. As the air therefrom passes through the apertures 97 and 99 it will draw air upwardly and through the bottom opening 96' so that the air is directed upwardly and outwardly with a rotating motion.

The conduit 83 on the section 66 includes an upwardly directed outlet 101 which has a flaring upper end 102 and has a damper 103 therein as shown in Fig. 13. Adjacent the lower portion of the flaring part I provide a transversely extending supporting strip 104 which includes an upper portion 105 and a lower portion 106 and side portions 107 which are suitably welded or otherwise secured in place.

The lower portion 106 is provided with a reinforcing member 108. The members 105, 106 and 108 are provided with aligned apertures which receive a rotatable shaft 109 on which an outlet member 110 is mounted. This member includes a top portion 111 having outlet apertures 112 disposed between downwardly directed vane members 113 which are of the configuration shown in Figs. 13 and 14 and which are inclined so that the column of fluid striking thereagainst will cause the member 110 to rotate as the air passes through the apertures 112 and out from under the top portion 111 with a rotating motion.

The conduit member 83a on the section 66 has an upwardly directed outlet 114 (Figs. 16, 17 and 18) and has a damper 116 therein and has slots 115 in the upper portion. Supporting rods 116 are secured to the upper end of the outlet 114 by wing nuts 117 which pass through the slots 115.

A double conical head 119 having the outer edge slanting downwardly as at 120 is secured to the upper end of the supporting rods 116 as at 118. I also provide louvres 121 and 122 as shown in Fig. 16.

In the upwardly directed outlet 114 I arrange a transversely extending supporting strip 123 on which a bracket 124 is secured and which has aligned apertures 124' which receive a shaft 125 which rotates on a ball bearing 126. Secured to the upper end of the shaft 125 I provide a one bladed fan which is rotated as the air passes therefrom.

In the operation of my apparatus the heater is caused to operate and the blower prime mover is also operated. The products of combustion pass from the casing 13 through the outlet member 60 and enter the conduit 64. The inlets 23 which are disposed on the sides and ends of the housing 14 are adjusted to suit the requirements at the time the apparatus is used. For instance, if there is considerable wind the closure members 25 of the inlets 23 on the windward side are closed and those on the other side are opened. This matter of regulating the inlet is an important one since the full efficiency of the heating apparatus is thus secured regardless of how much wind may be blowing.

The heated products of combustion which have remained with the fresh air entering the inlets pass through the conduit 64 and through the outlets 78 and 79 into the conduits 82, 83, etc. The outlets 85, 101, 114, etc. are so designed and regulated that the correct distribution of the warm air is assured. The particular arrangement of these outlets as shown in the drawings is only diagrammatic and it may be necessary to place certain of the outlet members more remote from the heater than is shown in the drawings or some of these outlets may be placed closer to the heater.

This particular arrangement would depend on the conditions in the grove, the atmospheric conditions and the size and shape of the trees. If the outlets are placed under the trees then the type shown in Figs. 10, 13 and 16 may be well employed provided the foliage on the trees is thin so that there is space for lateral distribution. If the foliage is heavy then the other types may be employed.

With my apparatus there is no requirement that the individual orchard heaters be filled and the conduits may be so arranged that the trees in various parts of the orchard may be properly protected. It will be understood that changes may be made without departing from the spirit of my invention which is set forth in the appended claims.

Having thus described my invention I claim:

1. In an orchard heater, a housing having an outlet, means to direct heated products of combustion and warmed air through the outlet, a distributing unit communicating with said outlet, an outlet communicating with said distributing unit, an elbow, the outer end of said outlet flaring outwardly, a support member in said outlet elbow, a closure member having a shaft rotatable on said support, said closure member having a top portion, inwardly directed tongues punched from said top portion, said top portion having vanes thereon.

2. In an orchard heater, a housing having an outlet, means to direct heated products of combustion and warmed air through the outlet, a distributing unit communicating with said outlet, an outlet on said distributing unit, an elbow connected to said outlet, a conduit connected to said elbow, an elbow on said conduit, the outer end of said elbow flaring outwardly, a support member in said elbow, a closure having a shaft rotatable on said support, said closure having a top portion, said top portion having vanes thereon and having apertures disposed between said vanes.

3. In an orchard heater, a housing having an outlet, means to direct heated products of combustion and warmed air through the outlet, a distributing unit communicating with said outlet, an elbow connected to said distributing unit, a conduit connected to said elbow, an elbow on said conduit, the outer end of said elbow flaring outwardly, a support member in said elbow, a closure having a shaft rotatable on said support, said closure having a top portion, inwardly directed tongues punched from said top portion, said top portion having vanes thereon disposed between said tongues, said top portion having a downwardly directed flange thereon, said flange having spaced apertures, said flange having an inwardly directed bottom, said bottom being adjacent to the flaring portion of said elbow and being larger than the exterior diameter of the adjacent portion of the elbow whereby air may pass around the elbow into the bottom of said closure.

4. In an orchard heater, a housing having a discharge outlet, means to direct heated products of combustion and warmed air through the outlet, a distributing unit communicating with said outlet, an outlet communicating with said distributing unit, an elbow, a closure spaced from the end of said elbow, a support member on said outlet elbow, a shaft rotatable on said support and an impeller on said shaft.

CHARLES H. AMES.